Figure 1:
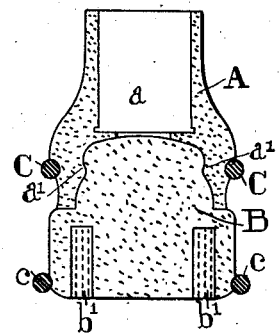

F. C. LYNDE.
PAD USED ON CRUTCHES, ARTIFICIAL LIMBS, AND STICKS.
APPLICATION FILED SEPT. 27, 1918.

1,340,616.  Patented May 18, 1920.

Witnesses:
C. A. Rowe

Inventor
Frederick C. Lynde
by
Attorney

UNITED STATES PATENT OFFICE.

FREDERICK CHARLES LYNDE, OF MANCHESTER, ENGLAND.

PAD USED ON CRUTCHES, ARTIFICIAL LIMBS, AND STICKS.

1,340,616.

Specification of Letters Patent.

Patented May 18, 1920.

Application filed September 27, 1918. Serial No. 255,949.

*To all whom it may concern:*

Be it known that I, FREDERICK CHARLES LYNDE, a British subject, residing at Manchester, in the county of Lancaster, England, have invented certain new and useful Improvements in Pads Used on Crutches, Artificial Limbs, and Sticks; and I do hereby declare that the following is a full, clear, and exact description of the same.

This invention relates to elastic or resilient pads or buffers for the end of crutches, artificial limbs and sticks which are used to subdue the shock or concussion on striking the ground, in which a removable resilient block is secured in a socket of rubber or metal fitted on to the end.

These pads are usually made of rubber and are liable to slip more especially on slippery pavements and are subject to continual wear.

The invention is designed to prevent slipping and give greater ease and security to the user.

The invention comprises a pad formed as a double socket the upper part to fit on to the crutch or stick, and the lower part to receive a removable or renewable block and consists in forming the latter of, or incorporating with the latter, a non-slipping material and surrounding it with a metal ring to compress it and prevent spreading and retard wear.

The invention will be fully described with reference to the accompanying drawings which show in Figures 1, 2, 3 and 4, sectional elevation and plan of various examples of constructing the pad or buffer in accordance with the invention.

The pad or buffer is constructed with an upper portion A formed with a socket $a$ to fit on to the end of the crutch or stick in the ordinary way and an undercut or dovetail socket $a'$ below the end of the crutch, and with a resilient block B removable and renewable to fit into the lower socket $a'$.

The upper portion A may be of rubber, metal or other material molded, cast or stamped or otherwise made to the desired shape, and the lower portion or block B may be made of rubber, rubber composition, leather, vulcanized fiber or paper, rubber or leather, or wood or other similar material, and with any of these compositions or combinations of any of them may be incorporated with or without liquid india-rubber cement, a non-slipping material such as layers, coils, tubes or rings of canvas or insertion rubber hose, webbing, asbestos fibers or fabric, silicate cotton, hair, shredded metal compressed or otherwise, wire compressed or otherwise, woven wire placed on edge or otherwise, carborundum, emery, quartz or granite.

The upper part A may when made of rubber be bound around with a metal ring C to retain the lower portion B in position and the lower portion B may be bound with a metal ring $c$ to prevent spreading at the bottom, and by compression of the ring to consolidate the material forming the bottom surface and thus cause the pad to wear a longer time.

Figure 2:
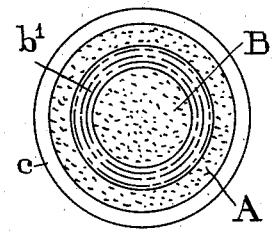

In the example shown in Figs. 1 and 2, the upper portion A of the pad is made of rubber or it may be of metal with a socket $a$ for the end of the crutch or stick and a socket $a'$ shaped or molded to receive the end of a block B of rubber or other suitable material into which is incorporated an annular coil or tube $b'$ of non-slipping material such as previously described. A metal ring C may be applied around the socket $a'$ to retain the block B in position, and a second metal ring $c$ may be placed around the lower edge of the block B to compress it, prevent spreading and retard wear. When the block B has worn down to the edge of the socket $a'$ it may be removed and replaced. The ring $c$ will gradually be pressed up the block B as it wears.

Figure 3:
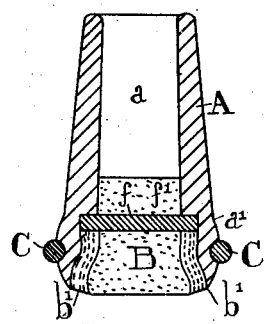

In the example shown in Fig. 3, the upper portion A of the pad is made of rubber or metal with a socket $a$ for the end of the crutch or stick and a socket $a'$ shaped or molded to receive a block B of rubber, vulcanized fiber or other material and around the block is placed a coil, tube or ring $b'$ of non-slipping material such as previously described. Above the block B is placed a metal plate $f$ and above it in the bottom of the socket $a$ a cushion $f'$ of rubber. A metal ring C is applied around the socket $a'$ to retain the block B in position.

Figure 4:
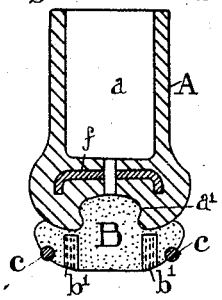

In the example shown in Fig. 4, the upper portion A of the pad is made of rubber—or it may be of metal—with a socket $a$ for the end of the crutch or stick and a socket $a'$ shaped or molded to receive the end of a block B of rubber or vulcanized fiber or other suitable material or composition of material. The upper part A when of rubber has a plate $f$ of metal embedded therein to stiffen it and secure the block B. The block B is similar to that previously described with a coil or tube $b'$ of non-slipping material, with a metal ring $c$ around it to compress it, prevent spreading and retard wear. When the block B has worn down to the edge of the socket $a'$ it may be removed and replaced. The resilient block B may be indented or slit at the top to facilitate insertion into the undercut socket $a'$.

A rubber cushion similar to $f'$ may be placed in the bottom of the socket $a$ in any of the examples shown if found desirable, and a metal plate similar to $f$ may be placed in the bottom of the socket $a$ in the example shown in Fig. 1 and such plate may be curved or domed on the upper surface and may be provided with a spike or projection to enter the end of the crutch or stick, or the plate may be convex on top and concave on the under side.

In the examples shown the bottom surface of the block B is square or at right angles to the vertical axis of the pad. If desired, for any particular construction of crutch the bottom surface of the block B may be curved or inclined to the vertical axis or so shaped as to accommodate the pad to the angle at which the crutch or stick approaches the ground, thereby approaching the normal shape that it would assume after being worn.

What I claim as my invention and desire to protect by Letters Patent is—

1. In a buffer or pad for crutches, artificial limbs or sticks the combination with a double socket of a removable resilient block inserted into one socket, a non-resilient material inserted in and incorporated in the removable resilient block and a metal plate positioned between said resilient block and the upper socket substantially as described.

2. A buffer or pad for crutches, artificial limbs or sticks comprising in its construction a double socket one socket to receive a crutch limb or stick end, a resilient removable block inserted in the other socket, an annular insertion of non-slipping material incorporated in the resilient block, a metal plate between the upper socket and the resilient block and means to compress the ground-engaging end of said resilient block.

Signed at Manchester, in the county of Lancaster, England, this fourth day of September, 1918.

FREDERICK CHARLES LYNDE.

Witnesses:
    J. OWDEN O'BRIEN,
    J. GREEVES O'BRIEN.